United States Patent [19]
Lew et al.

[11] Patent Number: 5,493,915
[45] Date of Patent: Feb. 27, 1996

[54] FLUID DYNAMIC TORSIONAL VORTEX SENSOR

[76] Inventors: Syok S. Lew; Yon S. Lew; Yon K Lew, all of 7890 Oak St., Arvada, Colo. 80005

[21] Appl. No.: 282,552

[22] Filed: Jul. 29, 1994

[51] Int. Cl.$^6$ .................................................. G01F 1/32
[52] U.S. Cl. ..................... 73/861.24; 73/861.02
[58] Field of Search .................. 73/861.02, 861.22, 73/861.23, 861.24

[56] References Cited

U.S. PATENT DOCUMENTS

| | | | |
|---|---|---|---|
| 4,911,019 | 3/1990 | Lew | 73/861.24 |
| 4,986,134 | 1/1991 | Lew | 73/861.24 |
| 5,095,760 | 3/1992 | Lew | 73/861.24 |
| 5,101,668 | 4/1992 | Lew | 73/861.24 |
| 5,127,273 | 7/1992 | Lew | 73/861.24 |

*Primary Examiner*—Hezron E. Williams
*Assistant Examiner*—Jewel V. Artis

[57] ABSTRACT

A torsional vortex sensor comprises an extended member disposed across a flow passage extending through a flowmeter body and experiencing a fluctuating fluid dynamic force associated with vortex shedding occurring in a stream of fluid moving through the flow passage wherein the extended member is supported by the flowmeter body in a relationship allowing at least a minute amount of pivotal movement of the extended member about a pivot axis perpendicular to the center line of the flow passage and offset from the geometrical center line of the extended member defined by a line connecting the geometrical center of every cross section of the extended member taken parallel to a plane including the center line of the flow passage, and at least one lateral extension member disposed exteriorly to the flow passage and extending from the extended member wherein the lateral extension member is connected to two force transmitting members respectively extending from two piezo electric transducers disposed respectively on two opposite sides of a plane including the pivot axis; wherein the two piezo electric transducers respectively generate two electrical signals which are combined into an alternating electrical signal representing the vortex shedding.

20 Claims, 3 Drawing Sheets

005,493,915

FLUID DYNAMIC TORSIONAL VORTEX SENSOR

FIELD OF INVENTION

This invention relates to a vortex sensor usable in the construction of a vortex shedding flowmeter, that has an optimized fluid dynamic structure providing a clear and consistent alternating electrical signal representing the vortex shedding and an optimized dynamic structure providing a maximum level of immunity to the noise created by the mechanical vibrations.

BACKGROUND OF INVENTION

One of the co-inventors of the present invention had invented a torsional vortex sensor providing a maximum immunity to the noise created by the mechanical vibrations of the sensor body, which invention has been disclosed in U.S. Pat. No. 5,101,668. Extensive experimenting with and testing of the vortex flowmeter disclosed in the above-mentioned U.S. Patent indicates that this version of the vortex flowmeter has a construction optimized only in vibration dynamic characteristics, but not in fluid dynamic characteristics. In most occasions, the lateral planar extensions disposed within the flow passage and laterally extending from the vortex sensing planar member in two opposite directions respectively across the two opposite halves of the flow passage divided from one another by the vortex sensing planar member or by the vortex generator-sensor, induces a fluid dynamic instability in the downstream region of the vortex generating bluff body and creates highly detrimental modulation or beating in the intensity of the vortex shedding, even when the vortex sensing planar member has a perfectly symmetric construction with respect to a plane defined by the vortex sensing planar member and dividing the flow passage hypothetically into the two opposite halves. While such a fluid dynamic instability does not alter the functional relationship between the vortex shedding frequency and the fluid velocity, the beating or modulation in the intensity of the vortex shedding produces strong beatings or modulations in an alternating electrical generated by a single or a pair of piezo electric transducers included in the vortex sensor and makes it very difficult to count the vortex shedding frequency. The present invention addresses a solution to the above-described problem by disclosing a torsional vortex sensor that is optimized not only in the vibrational dynamic characteristics but also in the fluid dynamic characteristics.

BRIEF SUMMARY OF INVENTION

The primary object of the present invention is to provide a torsional vortex sensing planar member disposed downstream of a vortex generating bluff body or in a planar cavity included in the vortex generating bluff body; wherein the vortex sensing planar member is supported by a supporting structure in a relationship allowing at least a minimal amount of pivotal deflection about a pivot axis parallel to and offset from a center line of the fluid dynamic force on the vortex sensing planar member, and the vortex sensing planar member is connected to a single or a pair of stress or strain transducers disposed in an offset relationship with respect to the pivot axis by one or more structural extensions laterally extending from the vortex sensing planar member, which lateral structural extension is disposed exteriorly to the flow passage.

Another object is to provide the torsional vortex sensor described in the afore-mentioned primary object of the present invention wherein the combination of the vortex sensing planar member and the lateral structural extension is inertially balanced about the pivot axis.

Yet another object is to provide the torsional vortex sensor described in the primary object of the invention wherein the combination of the vortex sensing planar member and the lateral structural extension is inertially balanced about a plane perpendicularly intersecting with a midsection of the vortex sensing planar member.

Yet a further object is to provide the torsional vortex sensor described in the primary object of the invention; wherein the pair of stress or strain transducers are disposed axisymmetrically about the pivot axis, and two electrical signals respectively generated by the pair of stress or strain transducers are combined to obtain an alternating electrical signal representing the vortex shedding.

Still another object is to provide a torsional vortex sensor built into the bluff body; wherein the vortex generating bluff body is supported by a supporting structure in a relationship allowing at least a minute amount of pivotal deflection about a pivot axis parallel to and offset from a center line of fluid dynamic force on the vortex generating bluff body, and the vortex generating bluff body is connected to a single or a pair of stress or strain transducers disposed in an offset relationship with respect to the pivot axis by one or more structural extensions laterally extending from the vortex generating bluff body, which lateral extension is disposed exteriorly to the flow passage.

Still a further object is to provide the vortex generator-sensor described in the afore-mentioned still another object of the present invention wherein the combination of the vortex generating bluff body and the lateral structural extension is inertially balanced about the pivot axis.

Yet still another object is to provide the vortex generator-sensor described in the still another object of the invention wherein the combination of the vortex generating bluff body and the lateral structural extension is inertially balanced about a plane perpendicularly intersecting with a midsection of the vortex generating bluff body.

Yet still a further object is to provide the vortex generator-sensor described in the still another object of the present invention; wherein the pair of stress or strain transducers are disposed axisymmetrically about the pivot axis, and two electrical signals respectively generated by the pair of stress or strain transducers are combined to obtain an alternating electrical signal representing the vortex shedding.

These and other objects of the present inventions will become clear as the description of the inventions progresses.

BRIEF DESCRIPTION OF FIGURES

The present invention may be described with a greater clarity and specificity by referring to the following figures.

DESCRIPTION OF ILLUSTRATED EMBODIMENTS

Figure 1:
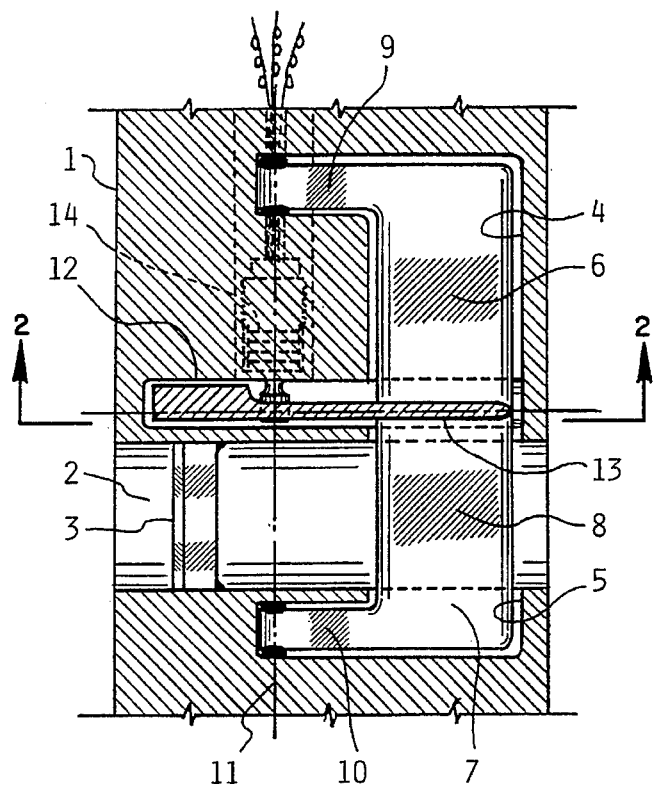
FIG. 1 illustrates a cross section of a vortex flowmeter employing an embodiment of the torsional vortex sensor of the present invention.

In FIG. 1 there is illustrated a cross section of a vortex flowmeter employing a torsional vortex sensor constructed and operating in accordance with the principles of the present invention, that shows an ideal structure for an insertion version of the vortex flowmeter constructed in the form of an elongated body 1 that is inserted into a stream of fluid moving through a large diameter conduit or pipe, or into an unbounded stream of fluid such as the wind in the atmosphere or water in a stream, river, or ocean. Of course, this particular illustrative embodiment can be also employed to construct an in-line version of the vortex flowmeter. The body 1 of the flowmeter has a flow passage 2 laterally extending therethrough, which flow passage includes a vortex generating bluff body 3 of an elongated cylindrical geometry disposed across the flow passage 2, and planar cavities 4 and 5 disposed on a plane including the center line of the flow passage 2 and respectively extending from and through two diametrically opposite portions of the wall of the flow passage 2 in two opposite directions lateral to the flow passage 2, which planar cavities 4 and 5 receive two opposite extensions 6 and 7 of a vortex sensing planar member 8 disposed downstream of the vortex generating bluff body 3 disposed across the flow passage 2. The two opposite extensions 6 and 7 of the vortex sensing planar member 8 respectively have two angular extensions 9 and 10 anchored to the body 1 at the extremities thereof, thereby supporting the vortex sensing planar member 8 in a pivotable relationship allowing at least a minor amount of pivotal deflection about a pivot axis 11 perpendicular to the center line of the flow passage 2 and parallel to the bluff body 3, which pivot axis 11 is parallel to and offset from the center line of the vortex sensing planar member 8 defined by a line passing through the geometrical center of every cross section of the vortex sensing planar member 8. In the particular illustrative embodiment, the extremities of the angled extensions 9 and 10 are fixedly secured to the body 1 by means of welding or clamping, while those extremities of the angled extensions 9 and 10 may be supported by the body 1 in a hinged relationship in an alternative design. The body 1 further includes a planar cavity 12 disposed adjacent to the flow passage 2 on a plane perpendicular to the planar cavities 4 and 5, and parallel to the center line of the flow passage 2, which planar cavity 12 receives a planar extension 13 laterally extending from the midsection of the combination of the vortex sensing planar member 8 and the two opposite extensions 6 and 7 thereof. The assembly of the structures making up the torsional vortex sensor, that includes the vortex sensing planar member 8 and its two opposite extensions 6 and 7, the pair of angled extensions 9 and 10, and the lateral planar extension 13, may have a mass distribution that is inertially balanced about the pivot axis 11, whereby the mechanical vibrations of the body 1 do not create any net pivotal motion of the torsional vortex sensor about the pivot axis 11. The lateral planar extension 13 transmits the pivotal deflection of the vortex sensing planar member 8 about the pivot axis 11 to a single or a pair of stress or strain transducers 14. The best results are obtained when the structural combination of the vortex sensing planar member 8 and its extensions 6, 7, 9 and 10 have a structure symmetric about a plane defined by the lateral planar extension 13.

Figure 2:
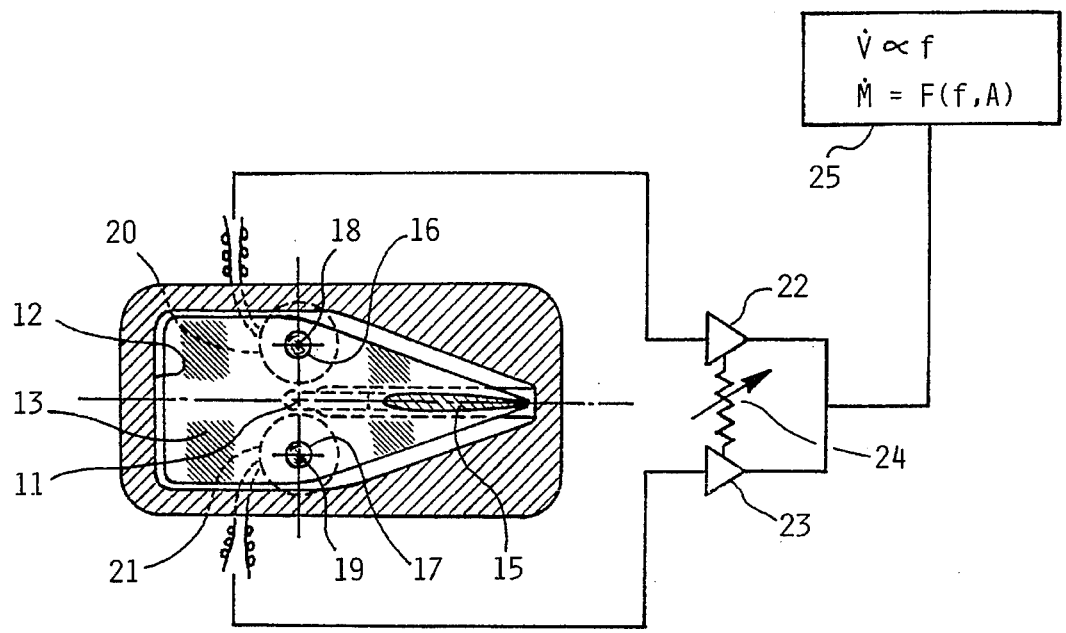
FIG. 2 illustrates another cross section of the vortex flowmeter shown in FIG. 1.

In FIG. 2 there is illustrated another cross section of the vortex flowmeter shown in FIG. 1, which cross section taken along plane 2—2 as shown in FIG. 1 shows the lateral planar extension 13 housed in the planar cavity 12 and laterally extending from the midsection 15 of the combined structure of the vortex sensing planar member 8 and its extensions. It should be noticed that the structure of the torsional vortex sensor including the vortex sensing planar member 8 and its extensions has a geometry substantially symmetric about three mutually orthogonal planes including the point of intersection between the pivot axis 11 and the lateral planar extension 13, and is inertially balanced about the pivot axis 11. The lateral planar extension 13 includes two holes 16 and 17 disposed axisymmetrically about the pivot axis 11, wherein the two holes 16 and 17 are respectively engaged by two force transmitting members 18 and 19 respectively extending from two stress or strain transducers 20 and 21 disposed respectively on two opposite sides of a plane including the pivot axis 11. It should be understood that, in the construction of a compact version of the vortex flowmeter, the torsional vortex sensor may not have a structure balanced inertially about the pivot axis 11 or symmetrized about the plane defined by the lateral planar extension 13. In an economic version of vortex flowmeter, only one of the pair of the transducers 20 and 21 may be employed.

The torsional vortex sensor shown and described in conjunction with FIGS. 1 and 2 operates on the following principles: The sinuating streamlines created by vortices shed from the bluff body 3 exerts an alternating lift force on the vortex sensing planar member 8 and, consequently, the torsional vortex sensor experiences a pivotal or torsional vibration of a minute amplitude about the pivot axis, wherein the pivotal or torsional vibration generates two electrical signals respectively from the pair of stress or strain sensors 20 and 21, which two electrical signals are respectively sent to two amplifiers 22 and 23 including a signal level balancing means 24 therebetween. The signal level balancing means 24 may include a variable resistor included at the output end of one of the two amplifiers 22 and 23, or a pair of variable resistors respectively included at the output ends of the pair of amplifiers. The output electrical signals from the two amplifiers 22 and 23 are combined to obtain a resultant alternating=electrical signal representing the vortex shedding from the bluff body 3 in such a way that the noise created by the mechanical vibrations of the body 1 is cancelled therebetween. A data processor 25 receiving the resultant alternating electrical signal determines the volume flow rate from the frequency of the resultant alternating electrical signal, as the fluid velocity is proportional to the frequency of the vortex shedding, and may determine the mass flow rate of the fluid as a function of the frequency and amplitude of the resultant alternating electrical signal, as the frequency is proportional to the fluid velocity and the amplitude is proportional to the dynamic pressure of the fluid flow that is equal to one half of the fluid density times the square of the fluid velocity. Of course, the data processor 25 may also determine the fluid density as the ratio of the mass flow rate to the volume flow rate of the fluid.

Figure 3:
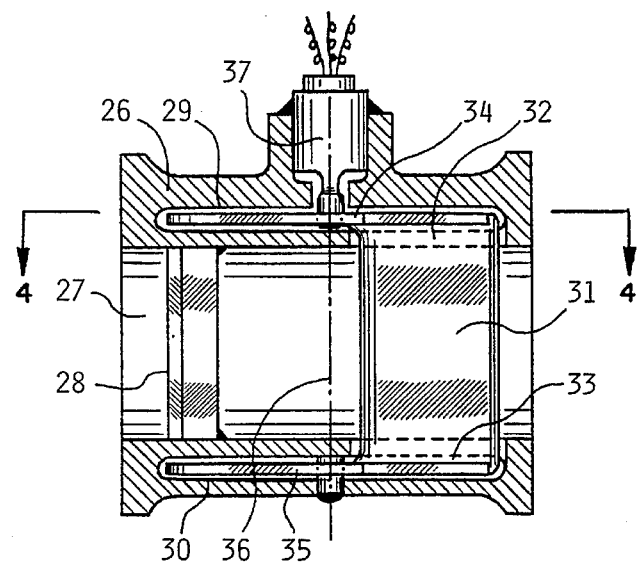
FIG. 3 illustrates a cross section of a vortex flowmeter employing another embodiment of the torsional vortex sensor of the present invention.

In FIG. 3 there is illustrated a cross section of a vortex flowmeter employing another embodiment of the torsional vortex sensor of the present invention, which has a construction suitable for an in-line vortex flowmeter. The flowmeter body 26 has a flow passage 27 including a vortex generating bluff body 28, and two parallel planar cavities 29 and 30 respectively disposed on two opposite sides of the flow passage 27 on planes perpendicular to the bluff body 28 and parallel to the center line of the flow passage 27, which two planar cavities 29 and 30 are open to the flow passage 27 through at least the downstream half of the wall of the flow passage 27. A vortex sensing planar member 31 is disposed across the flow passage 27 on a plane parallel to the bluff body 28 as well as to the center line of the flow passage 27, wherein the two opposite extremities 32 and 33 of the vortex sensing planar member 31 extend respectively into the two planar cavities 29 and 30 and respectively affixed to two lateral planar extension or planar supporting members 34 and 35 supported by the flowmeter body 26 in a relationship allowing at least a minute amount of pivotal motion about the pivot axis 36. Each of the lateral planar extensions or the planar supporting members 34 and 35 have construction similar to that of the lateral planar extension 13 included in the embodiment shown in FIG. 2, and at least one of the two lateral planar extensions or the planar supporting members 34 and 35 are connected to a single or a pair of stress or strain transducers such as the transducer 37 disposed in an offset relationship from the pivot axis as shown in FIG. 2. It is immediately recognized that the torsional vortex sensor comprising the vortex sensing planar member 31 and the two lateral extensions 34 and 35 employed in the construction of the vortex flowmeter shown and described in the particular illustrative embodiment is a structurally modified version of the torsional vortex sensor shown in FIG. 1 and, consequently, provides the same end result as that of the torsional vortex sensor shown and described in conjunction with FIGS. 1 and 2.

Figure 4:
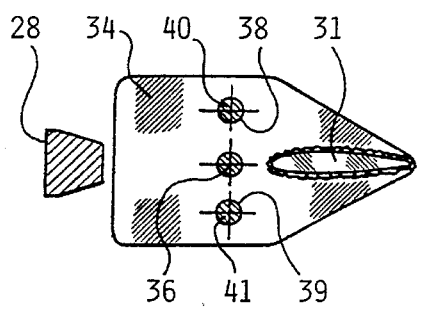
FIG. 4 illustrates another cross section of the vortex flowmeter shown in FIG. 3.

In FIG. 4 there is illustrated another cross section of the vortex flowmeter shown in FIG. 3, which cross section taken along plane 4—4 as shown in FIG. 3 shows one 34 of the two lateral planar extensions or planar supporting members 34 and 35 supporting the vortex sensing planar member 31 pivotably about the pivot axis 36, which lateral planar extension 34 includes two holes 38 and 39 disposed about the pivot axis 36 and respectively receiving two force transmitting members 40 and 41 respectively extending from two stress or strain transducers in an arrangement similar to that shown in FIG. 2.

Figure 5:
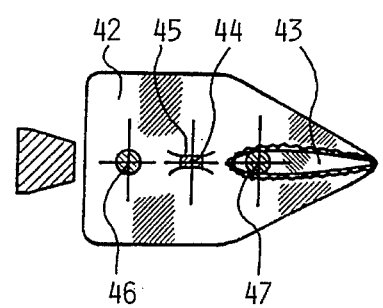
FIG. 5 illustrates a cross section equivalent to that shown in FIG. 4, which cross section illustrates a modified version of the torsional vortex sensor employed in the construction of the vortex flowmeter shown in FIG. 1 or 3.
Figure 6:
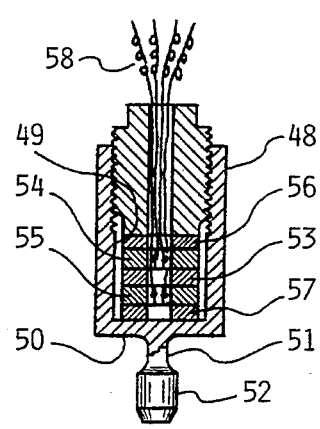
FIG. 6 illustrates a cross section of an embodiment of a stress or strain sensor usable in the construction of the torsional vortex sensor of the present invention.

In FIG. 5 there is illustrated a cross section similar to that shown in FIG. 6, that illustrates a revised version of the torsional vortex sensor shown in FIG. 4. In this particular illustrative embodiment, the lateral planar extension 42 laterally extending from the vortex sensing planar member 43 is supported pivotally about the pivot axis 44 by a leaf-spring or a torsion bar 45, and the pair of force transmitting members 46 and 47 respectively extending from the stress or strain transducers are disposed and connected to the lateral planar extension 42 axisymmetrically about the pivot axis 44 on a plane parallel to the vortex sensing planar member 43, which arrangement contrasts the embodiment shown in FIG. 4 wherein the two force transmitting members are disposed axisymmetrically about the pivot axis on a plane perpendicular to the vortex sensing planar member. It should be understood that the two force transmitting members respectively extending from the pair of stress or strain transducers constituting a torsion sensor, that detects the minute pivotal motion of the torsional vortex sensor about the pivot axis, may not be disposed on the plane including the pivot axis or axisymmetrically about the pivot axis as long as the two force transmitting members are disposed respectively on two opposite sides of a plane including the pivot axis.

In FIG. 6 there is illustrated a cross section of an embodiment of a piezo electric stress transducer assembly, that can be used as each of the pair of stress or strain sensors included in the embodiments of the torsional vortex sensor shown in FIGS. 2, 4 and 5. The transducer container vessel 48 to be affixed to the flowmeter body includes a cavity 49 having a thin deflective end wall 50 including a reinforcing rib 51 disposed diametrically across the thin deflective end wall 50 on a reference plane defined by the central axis of the force transmitting member 52 and the pivot axis of the torsional vortex sensor. The force transmitting member 52 extending from the thin deflective end wall 50 is anchored to the reinforcing rib 51. The cavity 49 contains the piezo electric transducer comprising a stacked combination of a piezo electric disc 53 sandwiched between a pair of electrode discs 54 and 55, and a pair of insulator discs 56 and 57, which stacked combination of the elements are pressed against the thin deflective end wall 50 by a plug 58 threadedly engaging the opening of the cavity 49. Each of the pair of electrode discs 54 and 55 are split into two semicircular electrodes along the reference plane including the reinforcing rib 51. The lead wires 58 extend from respectively from the semicircular electrodes in an electrically conducting contact with one of the two opposite side faces of the piezo electric disc 53.

Figure 7:
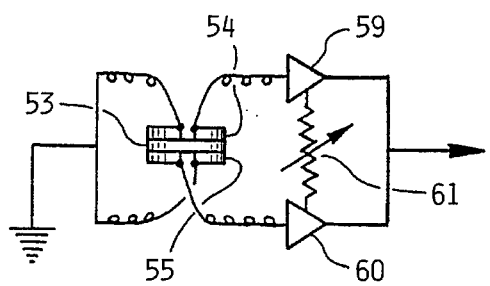
FIG. 7 illustrates an embodiment of the piezo electric transducer included in the stress or strain sensor shown in FIG. 6.

In FIG. 7 there is illustrated an embodiment of the piezo electric transducer included in the cavity of the transducer container vessel shown in FIG. 6, which piezo electric transducer comprises the piezo electric disc 53 sandwiched between the pair of insulator discs 54 and 55. Each of the pair of electrode discs 54 and 55 is split into two semicircular electrodes along the reference plane including the reinforcing rib 51 as explained in conjunction with FIG. 6. One electrode in contact with one side face of the piezo electric disc 53 and located on one side of the reference plane is connected to a first operational amplifier 59, while another electrode in contact with the other side face of the piezo electric disc 53 and located on the other side of the reference plane is connected to a second operational amplifier 60, which combination of the two amplifiers 59 and 60 includes a signal level balancing means 61 therebetween comprising one or a pair of variable resistors respectively included in the output ends of the two amplifiers 59 and 60. The other electrodes not connected to the amplifier 59 or 60 are grounded. The output signals from the two amplifiers 59 and 60 are additively combined in such a way that the noise is cancelled therebetween and a resultant alternating electrical signal representing the pivotal vibratory motion of the torsional vortex sensor is obtained, wherein the signal balancing means 61 is used to cancel the noise.

Figure 8:
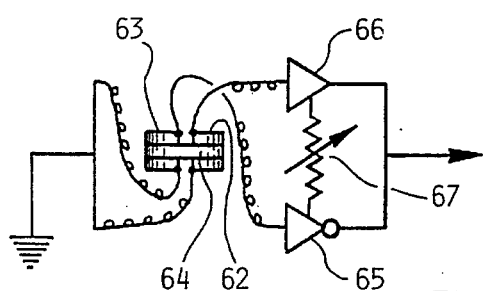
FIG. 8 illustrates another embodiment of the stress or strain sensor usable in place of the embodiment shown in FIG. 7.

In FIG. 8 there is illustrated another embodiment of the piezo electric transducer usable in place of the embodiment shown in FIG. 7. Two electrodes 62 and 63 in contact with the same side face of a piezo electric disc 64 and respectively located on two opposite sides of the reference plane are respectively connected to an inverting and noninverting amplifiers 65 and 66, which combination of the two amplifiers has a signal level balancing means 67, while the other electrodes not connected to the amplifier 64 or 65 are grounded. The resultant alternating electrical signal representing the pivotal vibratory motion of the torsional vortex sensor about the pivot axis is obtained by additively combining the outputs from the two amplifiers 64 and 65 in such a way that the noise is cancelled therebetween.

Figure 9:
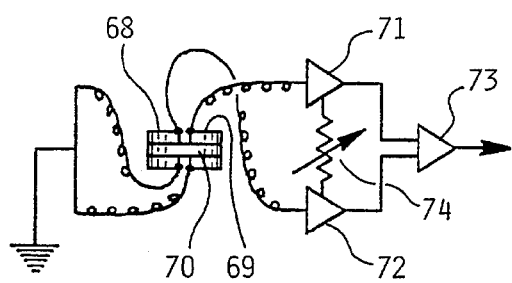
FIG. 9 illustrates a further embodiment of the stress or strain sensor usable in place of the embodiment shown in FIG. 7 or 8.

In FIG. 9 there is illustrated a further embodiment of the piezo electric transducer providing the same end result as that of the embodiment shown in FIG. 7 or 8. Two electrodes 68 and 69 in contact with the same side face of a piezo electric disc 70 and respectively located on two opposite sides of the reference plane are respectively connected to two operational amplifiers 71 and 72, while other electrodes not connected to the amplifier 71 or 72 are grounded. The resultant alternating electrical signal representing the pivotal vibratory motion of the torsional vortex sensor about the pivot axis is obtained by differentially combining the outputs from the two operational amplifiers 71 and 72 by using a differential amplifier 73. The signal level balancing means 74 including a single or a pair of variable resistors is used to cancel the noise between the two outputs from the two amplifiers 71 and 72. It should be noticed that, in tile embodiments shown in FIGS. 8 and 9, one of the two electrode discs providing the two grounded electrodes may not have the split construction.

Figure 10:
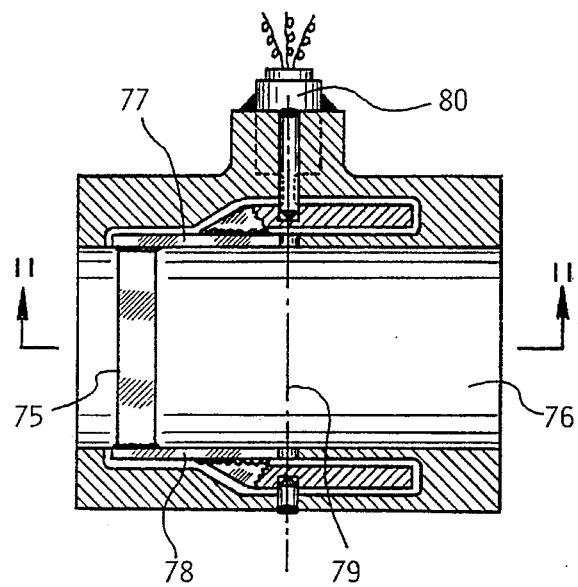
FIG. 10 illustrates a cross section of a vortex flowmeter employing a vortex generator-sensor including a built-in torsional vortex sensor.

In FIG. 10 there is illustrated a cross section of a vortex flowmeter employing a vortex generator-sensor including a built-in torsional vortex sensor. The vortex generating bluff body 75 disposed across a flow passage 76 is supported by a pair of lateral planar extensions 77 and 78 respectively extending from the two opposite extremities of the vortex generating bluff body 75 in a relationship allowing at least a minute amount of pivotal motion of the bluff body 75 about a pivot axis 79 parallel to and offset from the bluff body 75. Each of the pair of lateral planar extensions 77 and 78 has a construction similar to that of the lateral planar extensions shown in FIGS. 4 and 5, and one 77 of the pair of lateral planar extensions 77 and 78 are connected to one 80 or a pair of stress or strain transducers in a manner similar to that shown and described in conjunction with FIGS. 2, 4 and 5. As a matter of fact, the particular illustrative embodiment of the vortex generator-sensor with a built-in torsional vortex sensor is one of many different versions which results when the embodiments of the vortex flowmeter shown in FIGS. 1 through 5 are modified in such a way that the vortex generating bluff bodies included therein are omitted and the vortex sensing planar members are substituted with the vortex generating bluff body. For example, when the bluff body 3 included in the embodiment shown in FIG. 1 is omitted and the combination including the vortex sensing planar member 8 and its extensions 6 and 7 is replaced by a combination of a vortex generating bluff body and corresponding extensions, the particular embodiment shown in FIG. 1 becomes a highly preferred version of the vortex flowmeter with a vortex generator-sensor, that is ideal for the insertion type application.

Figure 11:
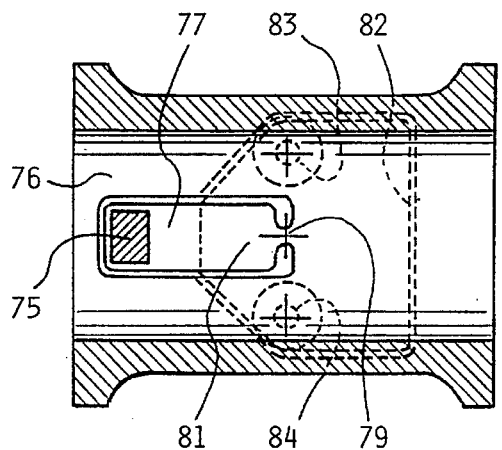
FIG. 11 illustrates another cross section of the vortex flowmeter shown in FIG. 10.

In FIG. 11 there is illustrated another cross section of the vortex flowmeter with the vortex generator-sensor shown in FIG. 10, which cross section taken along plane 11—11 as shown in FIG. 10 shows one 77 of the pair of lateral planar extensions 77 and 78 holding the two opposite extremities of the vortex generating bluff body 75. The lateral planar extensions 77 and 78 have a typical construction including a first planar portion 81, that is disposed substantially flush to the wall of the flow passage 76, laterally extending from one extremity of the bluff body 75 and secured to the wall structure of the flow passage 76 at the extremity thereof having a reduced section including the pivot axis 79, and a second planar section 82 affixed to the first planar portion 81 in such a way that the torsional vortex generator-sensor assembly including the vortex generating bluff body 75 and the pair of planar extensions 77 and 78 are inertially balanced about the pivot axis. A pair of holes 83 and 84 included in the second planar portion 82 of the lateral planar extension 77, which are disposed on a plane perpendicular to the center line of the flow passage 76 and including the pivot axis 79, respectively receives two force transmitting members respectively extending from a pair of stress or strain sensors such as the piezo electric transducer assembly shown in FIG. 6.

Figure 12:
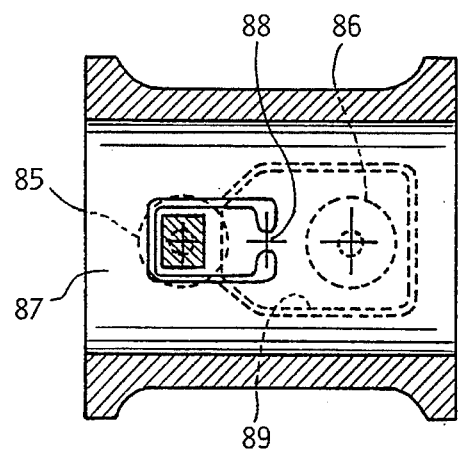
FIG. 12 illustrates a cross section equivalent to that shown in FIG. 11, which cross section illustrates a modified version of the torsional vortex sensor built into the vortex generator.

In FIG. 12 there is illustrated a cross section of a modified version of the torsional vortex generator-sensor included in the embodiment shown in FIG. 11. In this particular illustrative embodiment, the pair of piezo electric transducers 85 and 86 are disposed on a plane parallel to the center line of the flow passage 87 and including the pivot axis 88 and connected to one 89 of the pair of lateral planar extensions respectively by the force transmitting members extending therefrom. It should be mentioned once again that the two holes included in the lateral planar extension and respectively receiving the two force transmitting members respectively extending from the pair of piezo electric transducers may not be disposed in an axisymmetric relationship as shown in FIGS. 11 and 12, because the pair of piezo electric transducers generates electrical signals, which are combined into the alternating electrical signal representing the pivotal vibratory motion of the torsional vortex generator-sensor about the pivot axis as long as the two holes receiving the two force transmitting members are located respectively on two opposite sides of any plane including the pivot axis. It should be understood that, in an alternative design, each of the pair of lateral planar extensions supporting the vortex generating bluff body can be disposed within a planar cavity partially isolated from the flow passage as shown in FIG. 3, or that the constructions of the lateral planar extensions respectively employed in FIGS. 3 and 10 are inter-changeable. It should be also understood that the other of the pair of lateral planar extensions such as the elements 35 and 78 respectively included in the embodiments shown in FIGS. 3 and 10 may be replaced by a simple angled extension such as the element 10 included in the embodiment shown in FIG. 1.

Figure 13:
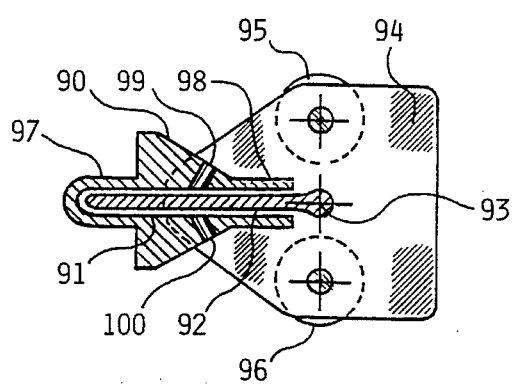
FIG. 13 illustrates a cross section of another embodiment of the vortex generator-sensor with a built-in torsional vortex sensor.

In FIG. 13 there is illustrated a cross section of another torsional vortex generator-sensor including a vortex generating bluff body 90 including a planar cavity 91, and a vortex sensing planar member 92 engaging the planar cavity 91 in a relationship allowing at least a minute amount of pivotal motion about the pivot axis 93, wherein the bluff body 90 is rigidly supported by the flowmeter body as exemplified by the arrangement illustrated in FIGS. 1 and 3, and the vortex sensing planar member 92 is supported by one or pair of lateral planar extensions 94 and mechanically linked to one or a pair of piezo electric transducers 95 and 96 in a manner similar to those shown and described in conjunction with FIGS. 1 through 5. In this particular illustrative embodiment, the bluff body 90 includes a leading edge extension 97 and a trailing edge extension 98, which combination enhances the sensitivity of the torsional vortex sensor-generator by providing a large surface area for the planar cavity 91 that accommodates the vortex sensing planar member 92 of a larger surface area. Two sets 99 and 100 of a plurality of holes respectively extending from the planar cavity 91 to the two opposite cylindrical sides of the bluff body 90 are included in order to introduce two alternatively fluctuating fluid pressures created by vortex shedding from the bluff body 90 onto the two opposite sides of the vortex sensing planar member 92.

Figure 14:
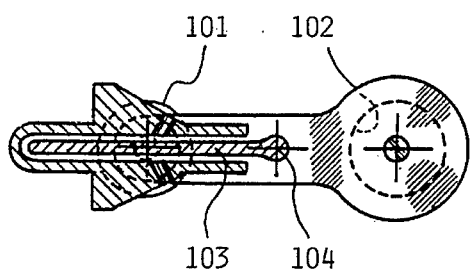
FIG. 14 illustrates a cross section of a further embodiment of the vortex generator-sensor with a built-in torsional vortex sensor.

In FIG. 14 there is illustrated a cross section of a modified version of the torsional vortex generator-sensor shown in FIG. 13. In this particular illustrative embodiment, the pair of piezo electric transducers 101 and 102 constituting a pivotal or torsional vibratory motion sensor detecting the pivotal vibratory motion of the vortex sensing planar member 103 about the pivot axis 104, are disposed on a plane parallel to the direction of the fluid flow in contrast to the embodiment shown in FIG. 13 wherein the pair of piezo electric transducers 95 and 96 are disposed on a plane perpendicular to the direction of fluid flow. In general, it is necessary to dispose the pair of piezo electric transducers respectively on two opposite sides of any plane including the pivot axis.

While the principles of the present inventions have now been made clear by the illustrative embodiments shown and described, there will be many modifications of the structures, arrangements, proportions, elements and materials, which are immediately obvious to those skilled in the art and particularly adapted to the specific working environments and operating conditions in the practice of the inventions without departing from those principles. It is not desired to limit the inventions to the particular illustrative embodiments shown and described and, accordingly, all suitable modifications and equivalents may be regarded as falling within the scope of the inventions as defined by the claims which follow.

The embodiments of the invention, in which an exclusive property of privilege is claimed, are defined as follows:

1. An apparatus for generating an alternating electrical signal representing vortex shedding from a vortex generator, comprising in combination:

a) a body including a flow passage;

b) an extended member disposed at least partially across the flow passage and experiencing a fluctuating fluid dynamic force associated with vortex shedding occurring in a fluid stream of fluid moving through the flow passage;

c) at least one lateral extension member disposed substantially exteriorly to the flow passage and extending laterally from the extended member experiencing the fluid dynamic force, wherein the structural combination of the extended member and said at least one lateral extension member is supported by the body in a relationship allowing at least minimal amount of pivotal movement about a pivot axis generally perpendicular to the center line of the flow passage and offset from a center line of the extended member defined by a line connecting the geometrical center of every cross section of the extended member taken along a plane parallel to the center line of the flow passage for the structural combination of the extended member and said at least one lateral extension member; and d) a transducer means connected to said at least one lateral extension member for detecting a pivotal vibratory motion of the structural combination of the extended member and said at least one lateral extension member, and generating an alternating electrical signal representing the vortex shedding occurring in the stream of fluid moving through the flow passage.

2. An apparatus as defined in claim 1 wherein said combination includes means for determining velocity of the fluid moving through the flow passage as a function of a frequency of the alternating electrical signal.

3. An apparatus as defined in claim 1 wherein said combination includes means for determining mass flow rate of the fluid moving through the flow passage as a function of a frequency and an amplitude of the alternating electrical signal.

4. An apparatus as defined in claim 1 wherein the extended member comprises a vortex sensing planar member disposed downstream of a vortex generating member of an elongated cylindrical shape disposed across the flow passage on a plane approximately parallel to the vortex generating member and to the center line of the flow passage.

5. An apparatus as defined in claim 4 wherein the transducer means comprises a pair of piezo electric transducers respectively including two force transmitting members disposed respectively on two opposite sides of a plane including the pivot axis and connected to said at least one lateral extension member, and means for combining two electrical signals respectively generated by the pair of piezo electric transducers into the alternating electrical signal representing the vortex shedding.

6. An apparatus as defined in claim 5 wherein the vortex sensing planar member disposed across the flow passage has two angled extensions extending out of the flow passage respectively in two opposite directions perpendicular to the flow passage and extremities of the two angled extensions are supported by the body at regions including the pivot axis, wherein said at least one lateral extension member extends laterally from a midsection of the structural combination of the vortex sensing planar member and the two angled extensions of the vortex sensing planar member.

7. An apparatus as defined in claim 6 wherein said combination includes means for determining velocity of the fluid moving through the flow passage as a function of a frequency of the alternating electrical signal.

8. An apparatus as defined in claim 5 wherein two opposite extremities of the vortex sensing planar member disposed across the flow passage are respectively secured to said at least one and another lateral extension members respectively disposed at two diametrically opposite cylindrical sides of the flow passage and supported by the body at regions including the pivot axis, wherein one of the pair of the lateral extension members is connected to the two force transmitting members respectively extending from the pair of piezo electric transducers.

9. An apparatus as defined in claim 8 wherein said combination includes means for determining velocity of the fluid moving through the flow passage as a function of a frequency of the alternating electrical signal.

10. An apparatus as defined in claim 1 wherein the extended member comprises a vortex sensing planar member disposed in a planar cavity included in a vortex generating member of an elongated cylindrical shape disposed across the flow passage in a relationship wherein two opposite sides of the vortex sensing planar member are respectively exposed to two fluid pressures respectively existing on the two opposite cylindrical sides of the vortex generating member.

11. An apparatus as defined in claim 10 wherein the transducer means comprises a pair of piezo electric transducers respectively including two force transmitting members disposed respectively on two opposite sides of a plane including the pivot axis and connected to said at least one lateral extension member, and means for combining two electrical signals respectively generated by the pair of piezo electric transducers into the alternating electrical signal representing the vortex shedding.

12. An apparatus as defined in claim 11 wherein the vortex sensing planar member disposed in the planar cavity included in the vortex generating member has two angled extensions extending out of the planar cavity and out of the flow passage respectively in two opposite directions and extremities of the two angled extensions are supported by the body at regions including the pivot axis, wherein said at least one lateral extension member extends laterally from a midsection of the structural combination of the vortex sensing planar member and the two angled extensions of the vortex sensing planar member.

13. An apparatus as defined in claim 12 wherein said combination includes means for determining velocity of the fluid moving through the flow passage as a function of a frequency of the alternating electrical signal.

14. An apparatus as defined in claim 11 wherein two opposite extremities of the vortex sensing planar member disposed in the planar cavity included in the vortex generating member are respectively secured to said at least one and another lateral extension members respectively disposed at two diametrically opposite cylindrical sides of the flow passage and supported by the body at regions including the pivot axis, wherein one of the pair of the lateral extension members is connected to the two force transmitting members respectively extending from the pair of the piezo electric transducers.

15. An apparatus as defined in claim 14 wherein said combination includes means for determining velocity of the fluid moving through the flow passage as a function of a frequency of the alternating electrical signal.

16. An apparatus as defined in claim 1 wherein the extended member comprises a vortex generating member of elongated cylindrical shape disposed across the flow passage.

17. An apparatus as defined in claim 16 wherein the transducer means comprises a pair of piezo electric transducers respectively including two force transmitting members disposed respectively on two opposite sides of a plane including the pivot axis and connected to said at least one lateral extension member, and means for combining two electrical signals respectively generated by the pair of piezo electric transducers into the alternating electrical signals representing the vortex shedding.

18. An apparatus as defined in claim 17 wherein said combination includes means for determining velocity of the fluid moving through the flow passage as a function of a frequency of the alternating electrical signal.

19. An apparatus as defined in claim 17 wherein the vortex generating member disposed across the flow passage has two angled extensions extending out of the flow passage respectively in two opposite directions and extremities of the two angled extensions are supported by the body at regions including the pivot axis, wherein said at least one lateral extension member extends laterally from a midsection of the structural combination of the vortex generating member and the two angled extensions of the vortex generating member.

20. An apparatus as defined in claim 17 wherein two opposite extremities of the vortex generating member disposed across the flow passage are respectively secured to said at least one and another lateral extension members respectively disposed at two diametrically opposite cylindrical sides of the flow passage and supported by the body at regions including the pivot axis, wherein one of the pair of the lateral extension members is connected to the two force transmitting members respectively extending from the pair of the piezo electric transducers.

* * * * *